(12) United States Patent
Jackson et al.

(10) Patent No.: US 8,484,963 B2
(45) Date of Patent: Jul. 16, 2013

(54) HYDROSTATIC TRANSMISSION BY-PASS MECHANISM

(75) Inventors: Gordon W Jackson, Clayton, NC (US); William R. Best, Benson, NC (US); Harold E. Mills, Raleigh, NC (US)

(73) Assignee: GXi Holdings, LLC, Clayton, NC (US)

( * ) Notice: Subject to any disclaimer, the term of this patent is extended or adjusted under 35 U.S.C. 154(b) by 697 days.

(21) Appl. No.: 12/795,803

(22) Filed: Jun. 8, 2010

(65) Prior Publication Data
US 2011/0296824 A1    Dec. 8, 2011

(51) Int. Cl.
*B60K 17/10*   (2006.01)
*F16H 39/14*   (2006.01)

(52) U.S. Cl.
USPC .............................................. 60/468; 60/487

(58) Field of Classification Search
USPC .......................................... 60/468, 487, 494
See application file for complete search history.

(56) References Cited

U.S. PATENT DOCUMENTS

| | | | | |
|---|---|---|---|---|
| 5,423,182 A | * | 6/1995 | Hauser et al. | 60/487 |
| 7,121,092 B1 | * | 10/2006 | Phanco et al. | 60/468 |
| 7,360,358 B1 | * | 4/2008 | Phanco et al. | 60/468 |
| 7,373,871 B1 | * | 5/2008 | Buescher | 92/12.2 |
| 2007/0044466 A1 | * | 3/2007 | Abend et al. | 60/487 |

* cited by examiner

*Primary Examiner* — Thomas E Lazo
(74) *Attorney, Agent, or Firm* — James G. Passé; Passé Intellectual Property, LLC

(57) ABSTRACT

A bypass pin for a hydrostatic transmission is disclosed. The hydrostatic transmission has a hydraulic pump. The bypass pin has a head positioned at one end of a shaft. The bypass pin also has a tip positioned at an opposite end of the shaft. The bypass pin is configured to receive a linear force exerted against the head in a first direction which causes the bypass pin to move in the first direction. The shaft of the bypass pin is configured to be positioned through a casing containing the hydrostatic transmission. The tip is configured to contact a rotating member in the hydraulic pump when the rotating member is in contact with a fluid directional member, the tip pushing the rotating member away from a fluid directional member in the first direction when the linear force is applied.

21 Claims, 13 Drawing Sheets

HYDROSTATIC TRANSMISSION BY-PASS MECHANISM

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to motorized power equipment and more specifically to motorized power equipment having an improved hydraulic pressure bypass mechanism.

2. Description of Related Art

Hydrostatic transmissions are typically used in motorized power equipment to provide movement. The primary function of any hydrostatic transmission (HST) is to accept rotary power from a prime mover (usually an internal combustion engine) having specific operating characteristics and transmit that energy to a load having its own operating characteristics. In the process, the HST generally must regulate speed and direction of rotation. Torque and power are generally constant because pressure is constant regardless of volumetric flow which regulates speed. Depending on its configuration, the HST can drive a load from full speed in one direction to full speed in the opposite direction, with infinite variation of speed between the two maximums, all with the engine operating at constant speed.

The operating principle of HSTs is relatively straight forward; a pump, connected to the engine, generates hydraulic fluid flow and pressure to drive a hydraulic motor, which is connected to the load. If the displacement of the pump and motor are fixed, the HST simply acts as a gearbox to transmit power from the engine to the load. Most HSTs use a variable-displacement pump so that speed and direction can be regulated. Some advantages of HSTs include, but are not limited to, the ability to transmit power in a relatively compact size and operate efficiently over a wide range of speed ratios at constant torque.

There are typically two types of HSTs, integrated and non-integrated (separate pumps and motors). The integrated HST consists of an integrated motor and pump together in the same housing. In a non-integrated construction the pump and motor are located separately and are coupled together via hoses and tubes. In this construction the engine is connected to the pump and the motor is connected to the load. By separating the pump and motor, multiple motors may be connected to the pump, thus allowing a single engine to operate multiple pumps. One advantage of this type of HST is that it allows power to be applied to loads that might be in locations that may be difficult to access.

There are two basic integrated HST configurations; open-circuit and closed-circuit configurations. Both refer to how the hydraulic lines in the system are connected. In an open circuit, fluid is drawn into the pump through a reservoir, routed to the motor, then re-enters the reservoir after passing through the hydraulic motor. In a closed circuit, the flow path is uninterrupted—fluid flows in a continuous path from the pump discharge port to the fluid motor inlet port, out the motor discharge port and back into the pump inlet.

When the HST is in operation, the flow of fluid within the HST causes the motor to rotate a drive shaft which in turn rotates a wheel (or wheels) connected thereto. The rotational speed of the wheel may be controlled by various gears or belts depending on how the drive shaft is connected to the wheel. However, when fluid is not flowing within the HST, the residual pressure causes the drive shaft to remain stationary and may be locked into place. When locked into place by the HST, the drive shaft may also cause the wheel or wheels to be locked into place.

In order to alleviate the locked condition, a pressure release valve may be utilized. The pressure release valve may cause the hydraulic pressure within the HST to be released as outlined in U.S. Pat. No. 6,755,019 issued to Phanco. As described in Phanco, rotating a bypass arm actuator causes a bypass actuator to separate the hydraulic motor from its motor running surface, thus releasing the pressure and allowing the wheels connected to the HST to freely rotate or "free wheel". Although, some resistance will still be present from fluid flow and mechanical friction.

The prior art bypass mechanism as described in Phanco uses rotational energy in order to activate the bypass mechanism. In some HST's the ability to rotate the bypass mechanism may be difficult given the tight spaces the HST's may be mounted into. The present invention addresses the differences as described in Phanco by providing a bypass mechanism that is pushed or pulled instead of rotated. Pushing or pulling the bypass mechanism instead of rotating it may allow the location of the bypass mechanism to be positioned on a part of the HST which may have greater clearance.

SUMMARY OF THE INVENTION

A hydraulic transmission is disclosed. The hydrostatic transmission has a hydraulic motor. The hydraulic motor receives rotational energy from a motor. The hydraulic motor pumps hydraulic fluid to a hydraulic pump. The hydrostatic transmission also has a bypass pin. The bypass pin has a head which is connected to a shaft which in turn is connected to a tip. The hydraulic pump receives the hydraulic fluid from the hydraulic motor. The hydraulic transmission is encased in a casing with the head of the bypass pin located outside the casing. The shaft of the bypass pin extends through the casing and into the hydraulic pump. The hydraulic pump also has a fluid directional member which is in contact with a rotating member. The hydraulic fluid flows from the hydraulic motor and is directed first through the fluid directional member, then through the rotating member. The hydraulic fluid within the hydraulic pump causes residual hydraulic pressure when the hydraulic motor is not pumping hydraulic fluid and the tip of bypass pin is configured to push the rotating member away from the fluid directional member when the bypass pin moves between a first and second position. The bypass pin is moveable when an external linear force is applied to the head of the bypass pin.

A bypass pin for a hydrostatic transmission is disclosed. The hydrostatic transmission has a hydraulic pump. The bypass pin has a head positioned at one end of a shaft. The bypass pin also has a tip positioned at an opposite end of the shaft.

The bypass pin is configured to receive a linear force exerted against the head in a first direction which causes the bypass pin to move in the first direction. The shaft of the bypass pin is configured to be positioned through a casing containing the hydrostatic transmission. The tip is configured to contact a rotating member in the hydraulic pump when the rotating member is in contact with a fluid directional member, the tip pushing the rotating member away from a fluid directional member in the first direction when the linear force is applied.

DETAILED DESCRIPTION OF THE INVENTION

Figure 1:
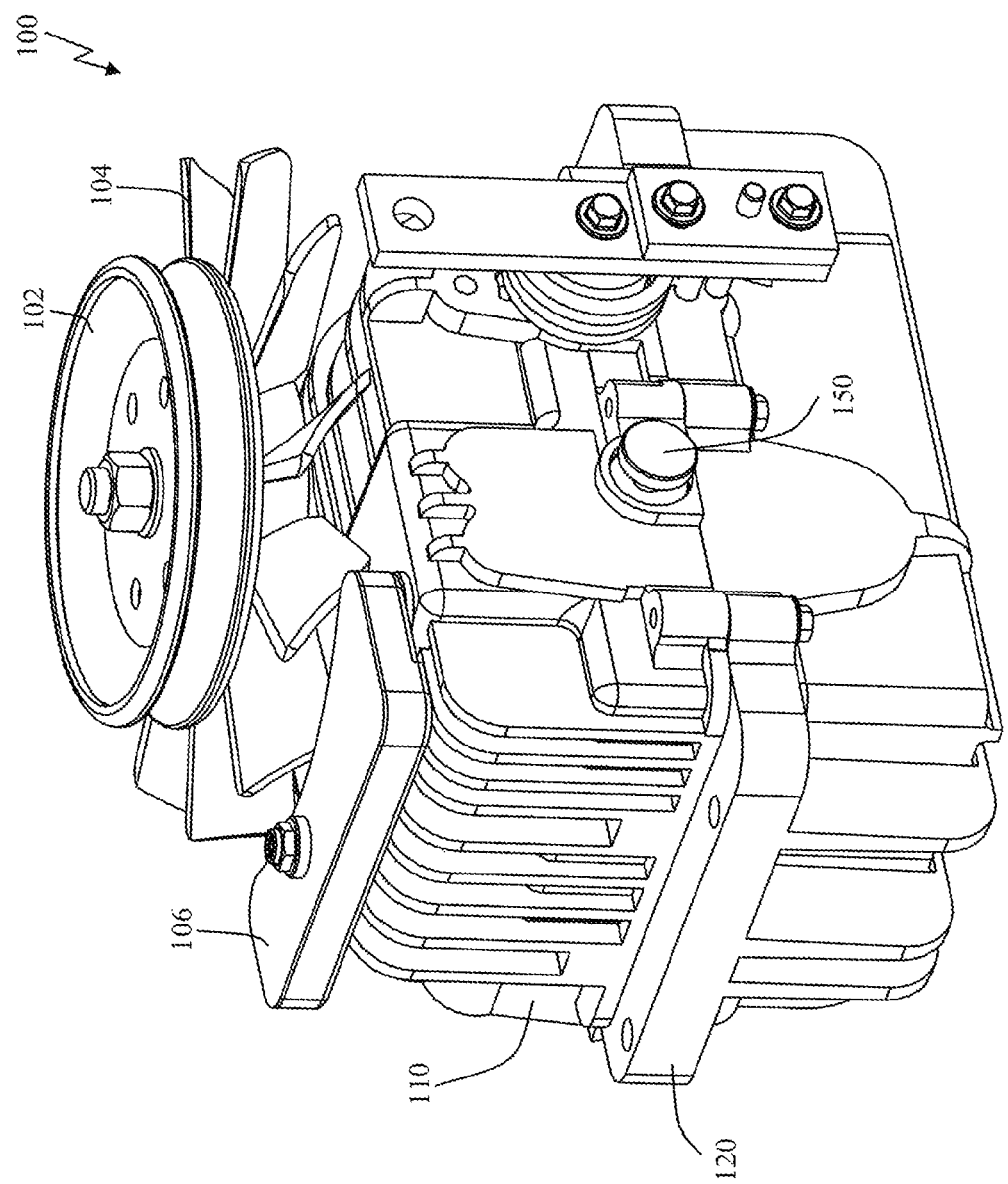
FIG. 1 displays a side perspective view of a Hydro Static Transmission (HST) having a pressure release pin in accordance with one embodiment of the present invention.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

FIG. 1 displays an integrated hydrostatic transmission 100. On the hydrostatic transmission 100 is a drive pulley 102 and cooling fins 104. The drive pulley 102 is typically connected via a belt to an engine. The drive pulley is positioned on an upper housing 110 which mates up with lower housing 120. The upper and lower housings 110 and 120 may be made of aluminum or other materials. When assembled, the hydrostatic transmission 100 may be filled with hydraulic fluid, oil or other type of fluid that may be used to operate the hydraulic pump and motor. In describing the inventive concepts of the present invention, hydraulic fluid is discussed; however, the inventive concepts of the present invention are not limited to the use of only hydraulic fluid. In addition, the HST may be mounted in any orientation.

Also located on top of the upper housing 110 is expansion chamber 106. If the hydrostatic transmission 100 is mounted in any other orientation, the expansion chamber will be located at the highest point of the housing. Positioned on a side of the hydrostatic transmission 100 is a bypass pin 150. As is explained in subsequent sections the bypass pin 150 extends into the hydrostatic transmission 100. When a linear force (non-rotational) is applied to the bypass pin 150 the bypass pin moves along a linear axis causing a release of the hydraulic pressure that may be present within the hydrostatic transmission 100.

As those skilled in the art may appreciate, when the drive pulley 102 is rotated by the engine, an input drive shaft connected to the drive pulley 102 also rotates. As the input drive shaft rotates, it operates a hydraulic pump which pumps hydraulic fluid. Hydraulic fluid is directed from the hydraulic pump to a hydraulic motor. The pressure caused by the hydraulic pump causes the hydraulic motor to rotate and in turn may cause a drive shaft to rotate, which may cause a wheel or wheels to rotate.

Because the hydrostatic transmission 100 is a closed system, when hydraulic fluid is not flowing, residual pressure remains between the hydraulic pump and motor. As is also explained in subsequent sections, when the bypass pin 150 is depressed, a rotating member of the hydraulic motor is separated from a fluid directional member allowing the hydraulic fluid to flow out of the closed system. When the hydraulic fluid flows out of the closed system, the residual pressure holding the hydraulic motor in place is relieved. After the hydraulic pressure is released, anything connected to the hydraulic motor is able to move.

In one exemplary embodiment, a drive shaft which may drive a wheel or wheels may be connected to the hydraulic motor. Prior to depressing the hydraulic pin, when the hydraulic pressure is present within the hydraulic motor, the drive shaft may be locked into place. When the drive shaft is locked into place, the wheels may not turn freely, thus locking the movement of the power equipment.

Figure 2:
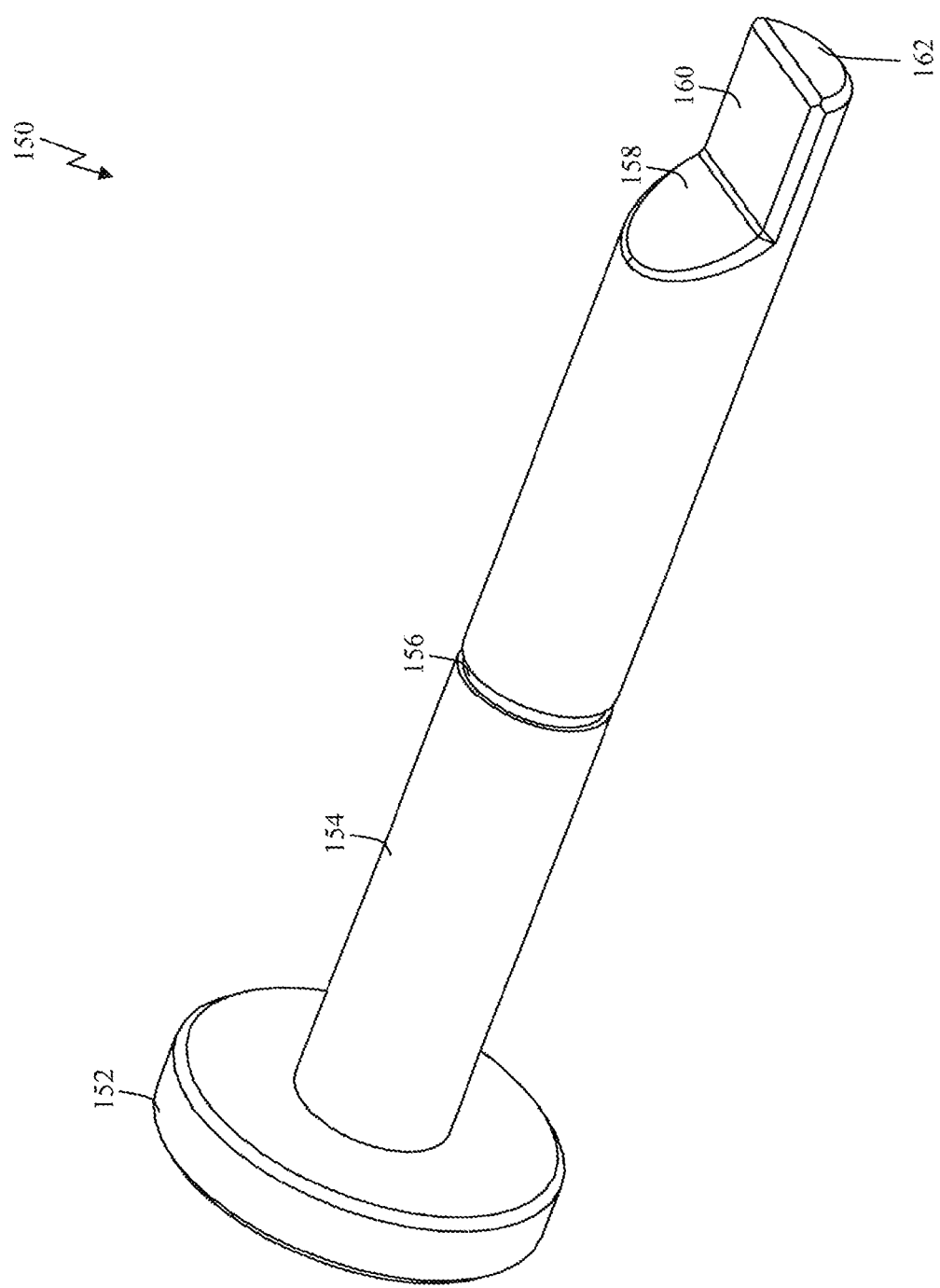
FIG. 2 shows a perspective view of a pressure release pin in accordance with one embodiment of the present invention.

FIG. 2 displays a bypass pin 150 in accordance with one embodiment of the present invention. The bypass pin 150 has a first end which is at one end of shaft 154. As shown in FIG. 2 the first end may be a head 152. Located on the shaft 154 is a groove 156. At the opposite end of the shaft 154 is an angled face 158, a flat face 160 and tip 162.

Figure 3:
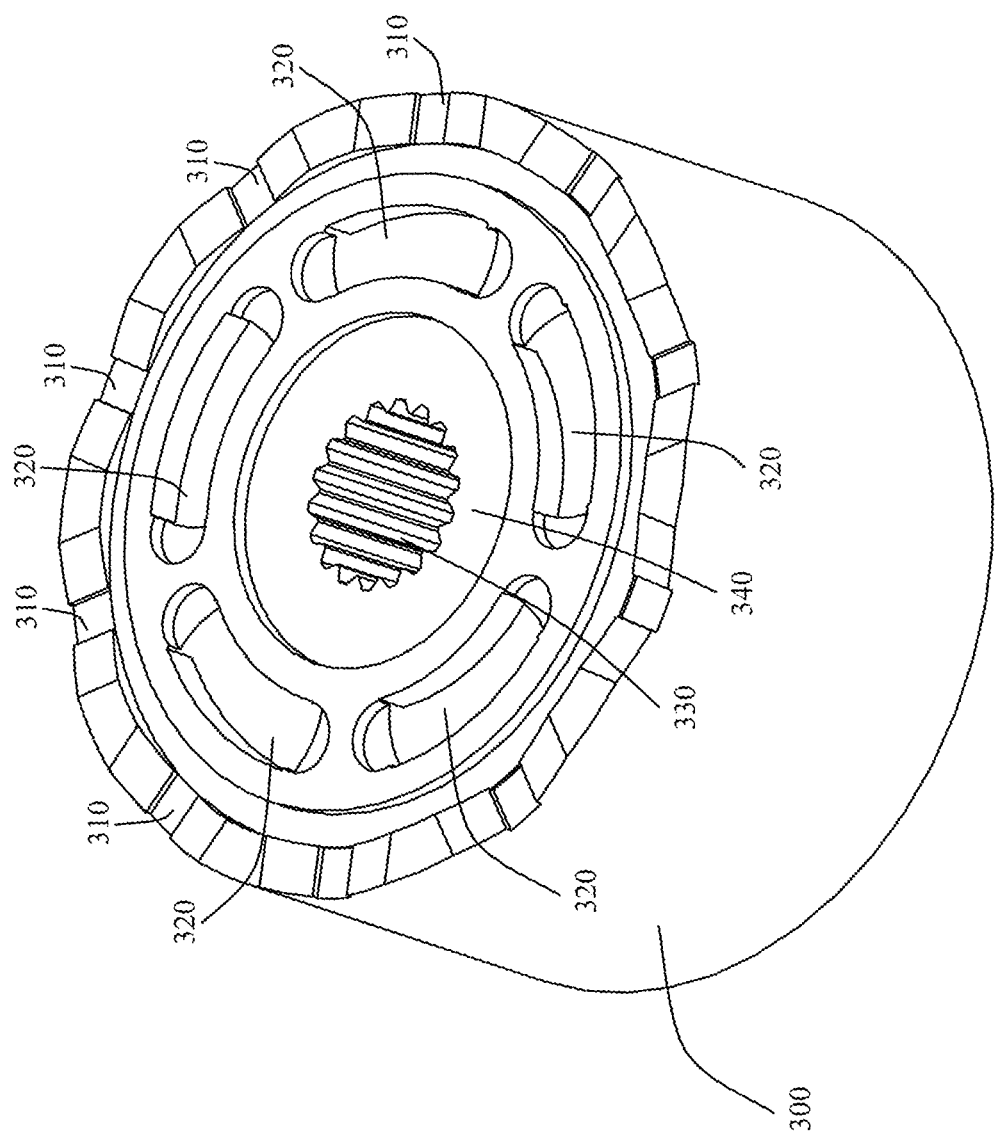
FIG. 3 displays a top perspective view of a hydraulic motor barrel in accordance with one embodiment of the present invention.

FIG. 3 displays a rotating member of the hydraulic motor. In the embodiment of FIG. 3, the rotating member is a barrel 300 of a hydraulic motor in accordance with one embodiment of the invention. The barrel has ports 320 which receive the hydraulic fluid that is pumped by the hydraulic pump. Around the circumference of the barrel 300 are gaps 310. The gaps provide an outlet for hydraulic fluid to flow should the pressure exceed a predetermined threshold. The gaps 310 are oil channels to provide lubrication between the bearing surfaces. In the center of the barrel 300 is an output drive shaft opening 330. As can be seen in FIG. 3, the output drive shaft opening 330 may be splined, serrated, keyed, or any other means of coupling the barrel to the drive shaft.

Thus, when the output drive shaft is inserted into the output drive shaft opening 330, they couple together. Located near the output drive shaft opening 330 is surface 340. As is described in subsequent sections, the tip 162 of bypass pin 150 makes contact against the surface 340 when the bypass pin 150 is depressed.

As those skilled in the art may appreciate, when hydraulic fluid is directed into the ports 320, the pressure from the fluid flow causes pistons installed within the barrel 300 to be forced outward away from the surface 340. As the pistons extend away from the surface 340 due to the hydraulic pressure, the pistons press up against an angled surface.

As the pistons come in contact with the angled surface (see FIG. 5), they cause the barrel 300 to rotate. The direction of rotation is determined by the direction of fluid flow into the ports 320. Those skilled in the art appreciate that the direction of the fluid flow may be determined by the position of a swash plate mounted on the hydraulic motor. In one position hydraulic fluid may flow in one direction. If the swash plate changes position, the hydraulic fluid flows in the opposite direction. As the barrel 300 rotates, the pressure on the fluid within the pistons is relieved and returned to the pickup side of the motor. Makeup fluid is drawn in from the reservoir to replace fluid lost from blow by.

Figure 4:
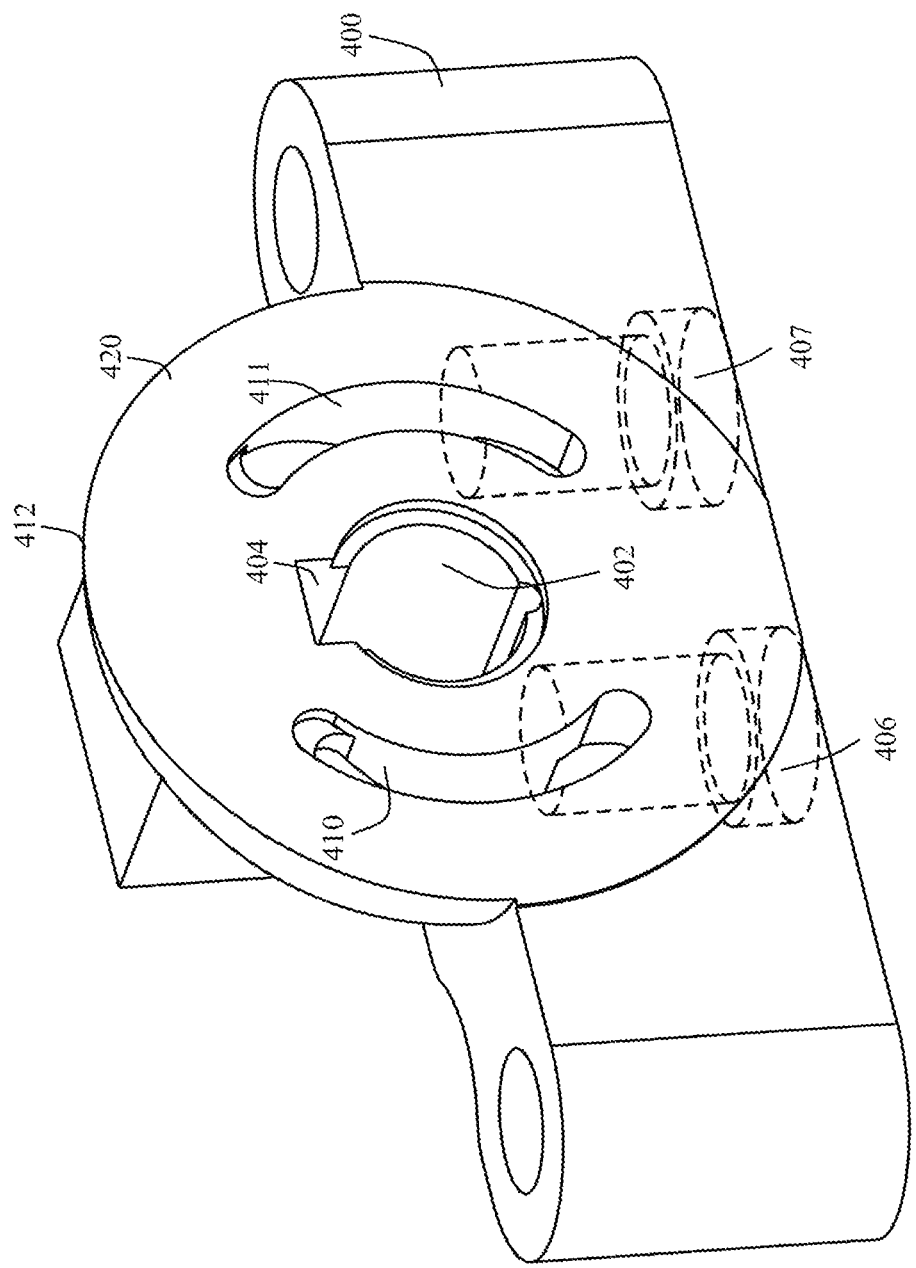
FIG. 4 displays a side perspective view of a valve body in accordance with one embodiment of the present invention.

FIG. 4 displays a fluid directional member in accordance with one aspect of the present invention. In the embodiment of FIG. 4, the fluid directional member may be an output valve body 400. The output valve body 400 accepts hydraulic fluid at either input ports 406 and 407 as it is pumped by the hydraulic motor. Depending on the direction of the hydraulic fluid flow from the pump, the fluid will be directed into one of the input ports 406 and 407 and then out the corresponding output port 410 or 411 on face 420. Also located on the output valve body 400 is a drive shaft opening 402, through which a drive shaft may protrude. The end of the drive shaft is supported by a roller bearing. At the top of the drive shaft opening 402 is pin opening 404 through which the tip 162 of the bypass pin 150 may protrude when the bypass pin 150 is attached to the hydrostatic transmission 100.

Figure 5:
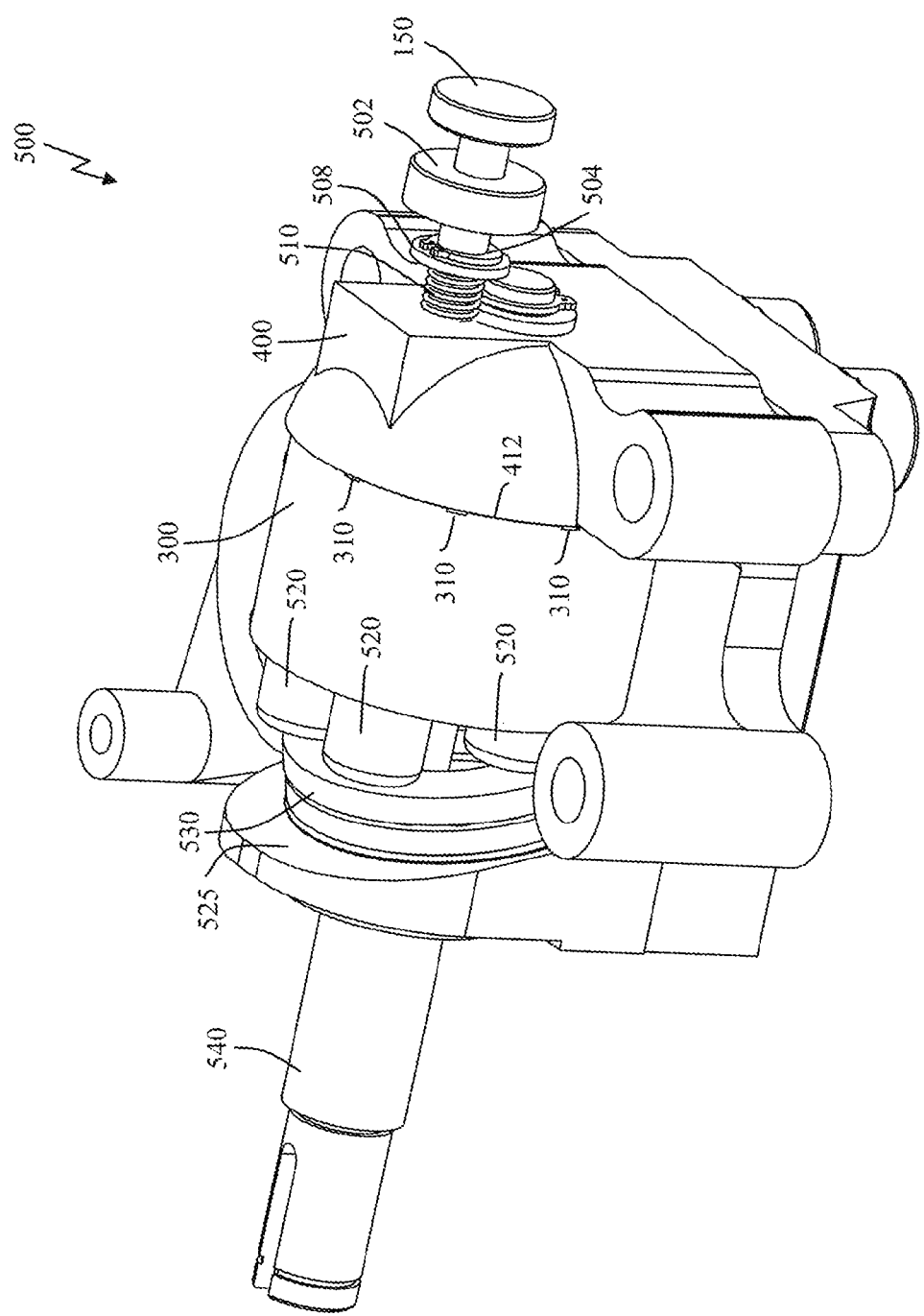
FIG. 5 displays a side perspective view of a hydraulic motor with the pressure release pin of FIG. 2 installed thereon in accordance with one embodiment of the present invention.

FIG. 5 displays a hydraulic motor 500 in accordance with one embodiment of the present invention. In the embodiment of FIG. 5, the barrel 300 of the hydraulic motor 500 is mated with the output valve body 400, outer edge 412 of the face 420 aligns with the barrel 300. However, in other embodiments, the output valve body may be larger than the outer diameter of the barrel 300. The barrel 300 may be held in place against the face 420 of the output valve body 400 by pressure exerted by springs within pistons 520. The pistons 520 make contact with thrust bearing 530 which abuts against angled surface 525. The thrust bearings 530 rotate with barrel 300 as fluid flows through the hydraulic motor 500. Protruding through the barrel 300, thrust bearing 530 and angled surface 525 is a drive shaft 540. As described previously, the drive shaft 540 also protrudes through output valve body 400 and extends slightly away from the output valve body 400. Positioned above the drive shaft 540 on the output valve body 400 is bypass pin 150.

When bypass pin 150 is installed, a return spring 510 may be inserted around the shaft 154 (See FIG. 2) and is held in place by a combination of flat washer 508 and retaining clip 504. The retaining clip 504 may be of sufficient dimension to fit into the groove 156 on the shaft 154. An oil seal 502 may also be inserted on the bypass pin 150 to keep any hydraulic fluid from escaping from the hydrostatic transmission 100 when the bypass pin is installed in the hydrostatic transmission 100.

It is the pressure applied by the tip 162 against the surface 340 (not shown for ease of illustration) which pushes the barrel 300 away from the output valve body 400 thus breaking the seal of the barrel 300 against the output valve body 400. Once the seal is broken, the hydraulic pressure within the hydrostatic transmission is also relieved and the barrel 300 may be able to rotate. If the barrel 300 is able to rotate, the drive shaft 540 may also be able to rotate. Anything coupled with the drive shaft 540 such as a wheel or wheels may also be allowed to move when the hydraulic pressure is released.

Figure 6:
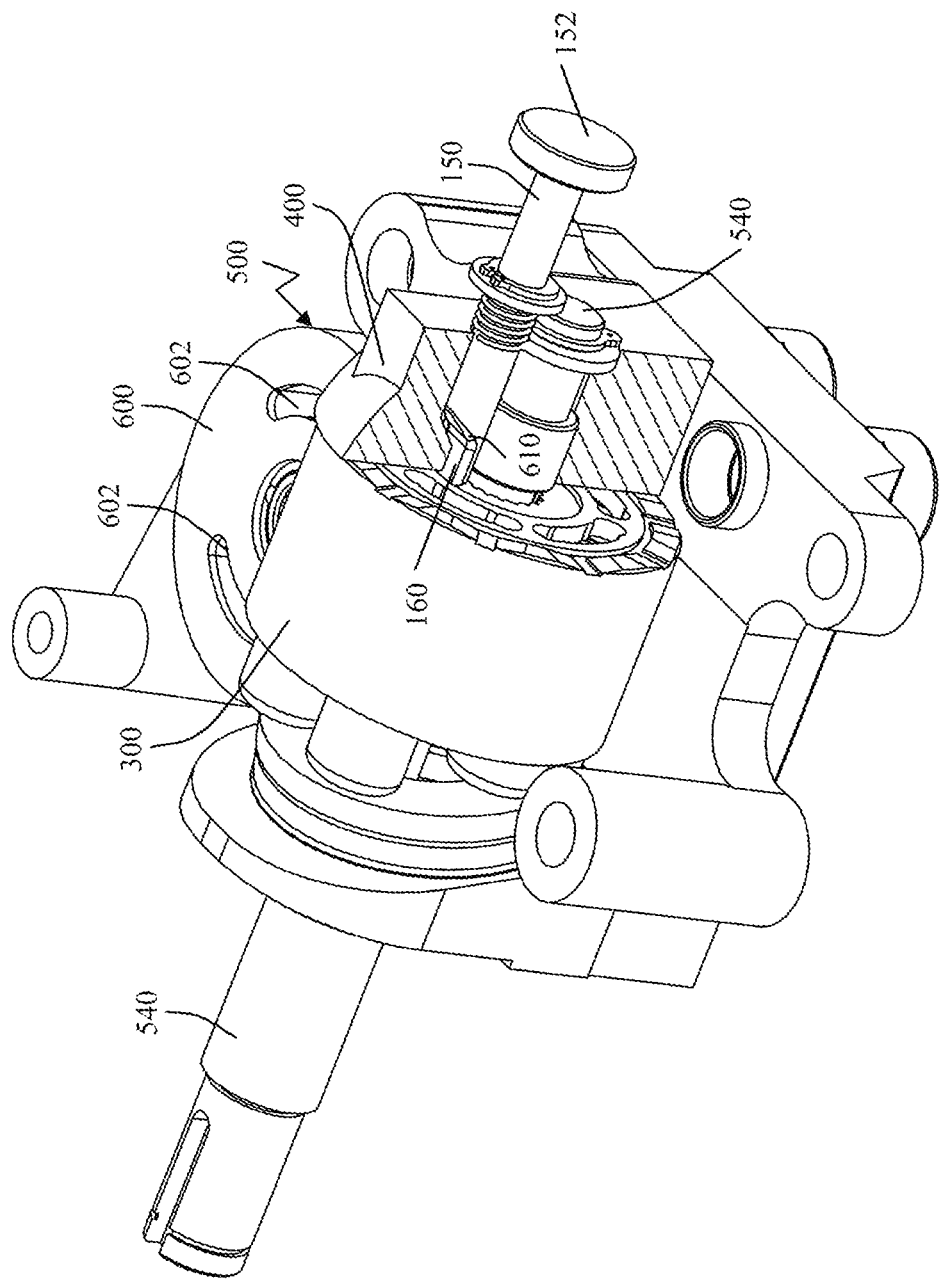
FIG. 6 displays a cut away view of the hydraulic motor of FIG. 5.

FIG. 6 displays a cutaway view of the output valve body 400 of the hydraulic motor 500 allowing a better view of the end of the bypass pin 150 as it makes contact with the barrel 300. The end of the bypass pin 150 has a flat surface 160 to serve as a guide and properly contact the barrel 300. When the head 152 of the bypass pin 150 is depressed along a linear axis, the tip comes into contact with the surface. The tip is designed to allow the bypass pin 150 to be depressed, pushing the barrel away from the output valve body 400 allowing the barrel 300 to rotate. As those skilled in the art may appreciate, the head 152 of the bypass pin 150 may be depressed along an axis that is parallel to the drive shaft 540. As is described in subsequent sections, alternate embodiments of the bypass pin may be designed to receive a linear force perpendicular to the movement of the tip of the bypass pin.

When the head 152 of the bypass pin 150 is depressed, and the barrel has separated from the output valve body 400, the barrel 300 is "freewheeling." When the barrel 300 is freewheeling, the rotational speed of the barrel tends to be very low. When the tip 162 of the bypass pin 150 has pushed the barrel 300 away from the output valve body 400, hydraulic fluid may be pumped by the hydraulic pump but will have no effect on the motor 500 since the fluid flow will not be directed into the ports 320. Instead the hydraulic fluid will return to the fluid reservoir.

When the barrel 300 is separated from the output valve body 400, hydraulic fluid can be pumped through the valve body, but the flowing fluid will not cause the barrel 300 to rotate. In a preferred embodiment, no damage to the bearings or sealing surfaces occurs when the barrel 300 is freewheeling.

Figure 7:
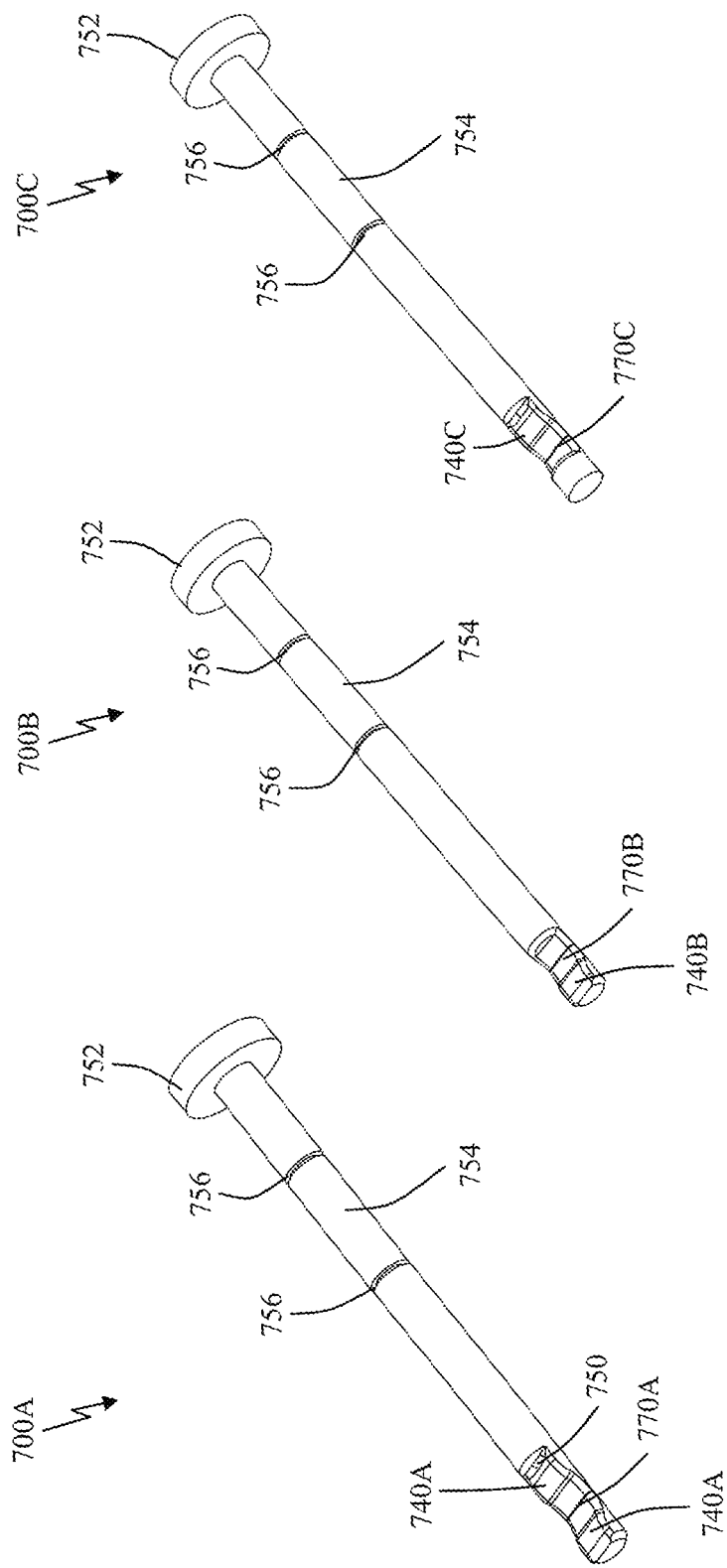
FIG. 7A displays a perspective view of a pressure release pin in accordance with a further embodiment of the present invention.
FIG. 7B displays a perspective view of a pressure release pin in accordance with another embodiment of the present invention.
FIG. 7C displays a perspective view of a pressure release pin in accordance with a further embodiment of the present invention.

FIGS. 7A, 7B and 7C display a bypass pin 700A, 700B, and 700C respectively in accordance with further embodiments of the present invention. Bypass pin 700A may be pushed or pulled in order to release hydraulic pressure within the hydraulic motor 100 (FIG. 1) when installed therein. Bypass pin 700B is pulled in order to release hydraulic pressure and bypass pin 700C is designed to be pushed only.

The bypass pin 700A has a shaft 754 which has a first end 752. In the embodiment of FIG. 7A, the shaft 754 is cylindrical although alternative embodiments may be of various configurations. Other types of shafts may have a cross-section configuration that may be, but are not limited to, square, rectangular, octagonal, and the like. Located on the shaft 754 are grooves 756. Positioned at an opposite end on of the shaft 754 are angled surfaces 740A and depression 770A as well as detent 750. In addition, the bypass pin 700A is shown with two angled surfaces 740A to allow the bypass pin 700A to either be pushed or pulled.

The bypass pin 700A may have three operational positions. For example, the bypass pin 700A may have a disengaged position, an engaged position when pulled and an engaged position when pushed. The amount of distance the bypass pin 700A may travel may be limited by a ring (not shown for ease of illustration) which may be installed in the groves 756. In addition, the detent 750 may allow the bypass pin 700A to lock into place when the bypass pin 700A is in the engaged position. The detent 750 may be positioned on either side of depression 770A. As shown in FIG. 7A, the detent 750 may be utilized when the bypass pin 700A is pushed in order to move the bypass pin 700A into the engaged position. Although detent 750 is only shown on bypass pin 700A it could also be positioned on bypass pins 700B or 700C. The detent 750 may be circular or rectangular in shape to mate up with the various actuators (see FIGS. 8 and 9) that may be used in conjunction with the bypass pin 700A.

FIG. 7B displays bypass pin 700B. The bypass pin 700B has a shaft 754 which has a first end 752. In the embodiment of FIG. 7B, the first end 752 may be a head. The shaft 754 is cylindrical although alternative embodiments may be of various configurations. Located on the shaft 754 are grooves 756. Positioned at an opposite end on of the shaft 754 are angled surfaces 740B and depression 770B. Bypass pin 700B has only one angled surface 740BA to allow the bypass pin 700A to pulled when engaged.

The bypass pin 700B may have two operational positions. For example, the bypass pin 700B may have a disengaged position (or rest position) and an engaged position when pulled. The amount of distance the bypass pin 700A may travel may be limited by a ring (not shown for ease of illustration) which may be installed in the groves 756.

FIG. 7C displays a bypass pin 700C in accordance with another embodiment of the present invention. The bypass pin 700C has a shaft 754 which has a first end 752.

The first end 752 may also be a head. In the embodiment of FIG. 7C, the shaft 754 is cylindrical although alternative embodiments may be of various configurations. Other types of shafts may have a cross-section configuration that may be, but are not limited to, square, rectangular, octagonal, and the like. Located on the shaft 754 are grooves 756. Positioned at an opposite end of the shaft 754 is angled surface 740C and depression 770C. The bypass pin 700C is shown with one angled surfaces 740C to allow the bypass pin 700C to be pushed.

Similar to bypass pin 700B, the bypass pin 700C may have two operational positions. For example, the bypass pin 700C may have a disengaged position (rest position) and an engaged position when pushed. The amount of distance the bypass pin 700C may travel may be limited by a ring (not shown for ease of illustration) which may be installed in the groves 756.

Figure 8:
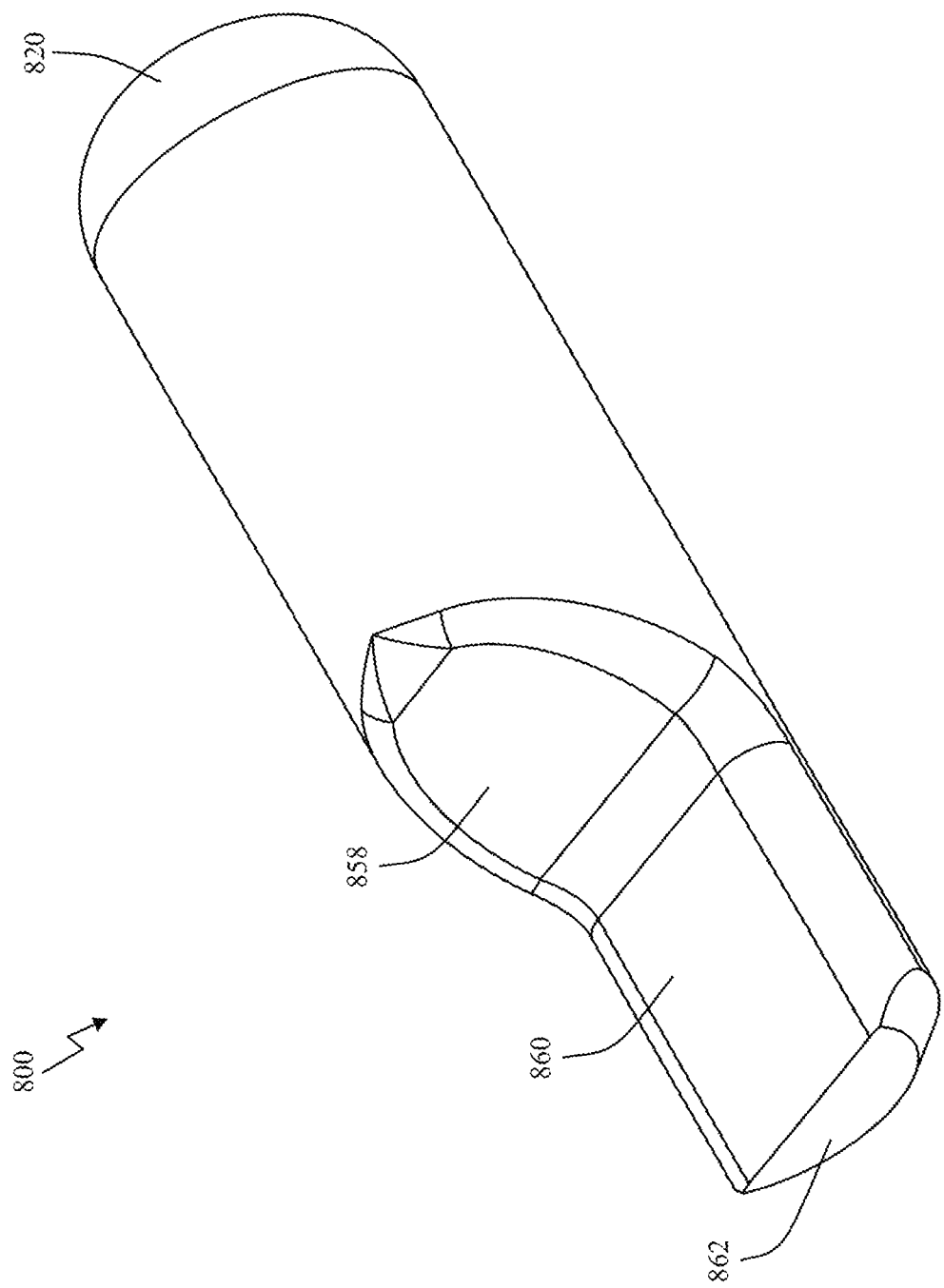
FIG. 8 displays an actuator for use with the pressure release pins of FIGS. 7A, 7B or 7C.
Figure 9:
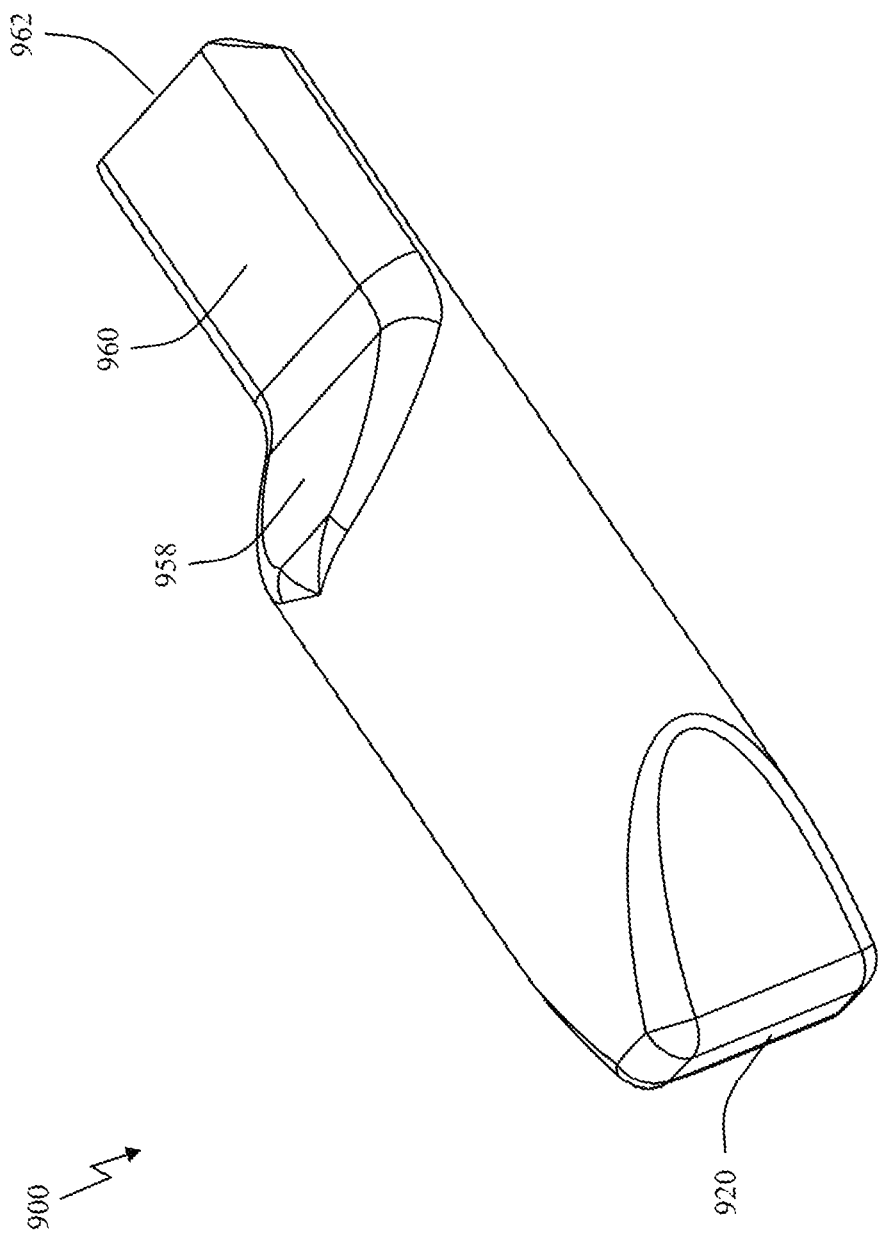
FIG. 9 displays another actuator for use with the pressure release pins of FIGS. 7A, 7B or 7C.

The bypass pins 700A, 700B or 700C may be used in conjunction with an actuator 800 shown in FIG. 8 or actuator 900 shown in FIG. 9. For ease of illustration the inventive concepts of the present invention are described with bypass Pin 700A. Both actuators 800 and 900 have contoured ends. More specifically, the actuator 800 of FIG. 8 has a rounded end 820 as well as an angled face 858, flat face 860 and tip 862. The contoured end of actuator 900 (FIG. 9) may be an angled end 920. The actuator 900 also has an angled face 958, flat face 960 and tip 962. In one configuration, the actuators 800 or 900 may be positioned orthogonally with respect to the bypass pin 700A (FIG. 7A). In this configuration, the rounded end 820 or angled end 920 would be positioned in the depression 770A when the bypass pin 700A is in the disengaged position.

When the bypass pin 700A is in the disengaged position, the hydraulic pressure in the hydraulic motor remains pressurized. When the bypass pin 700A moves into the engaged position, the hydraulic pressure is relieved as the tip 862 or 962 pushes the barrel away from the output valve body. The bypass pin 700A and actuator 800 or 900 may be used in place of bypass pin 150 should the bypass pin 700A be positioned orthogonally with respect to the drive shaft. However, it should be noted that the actuators 800 and 900 do not necessarily need to be orthogonal with the bypass pin 700A.

Figure 10:
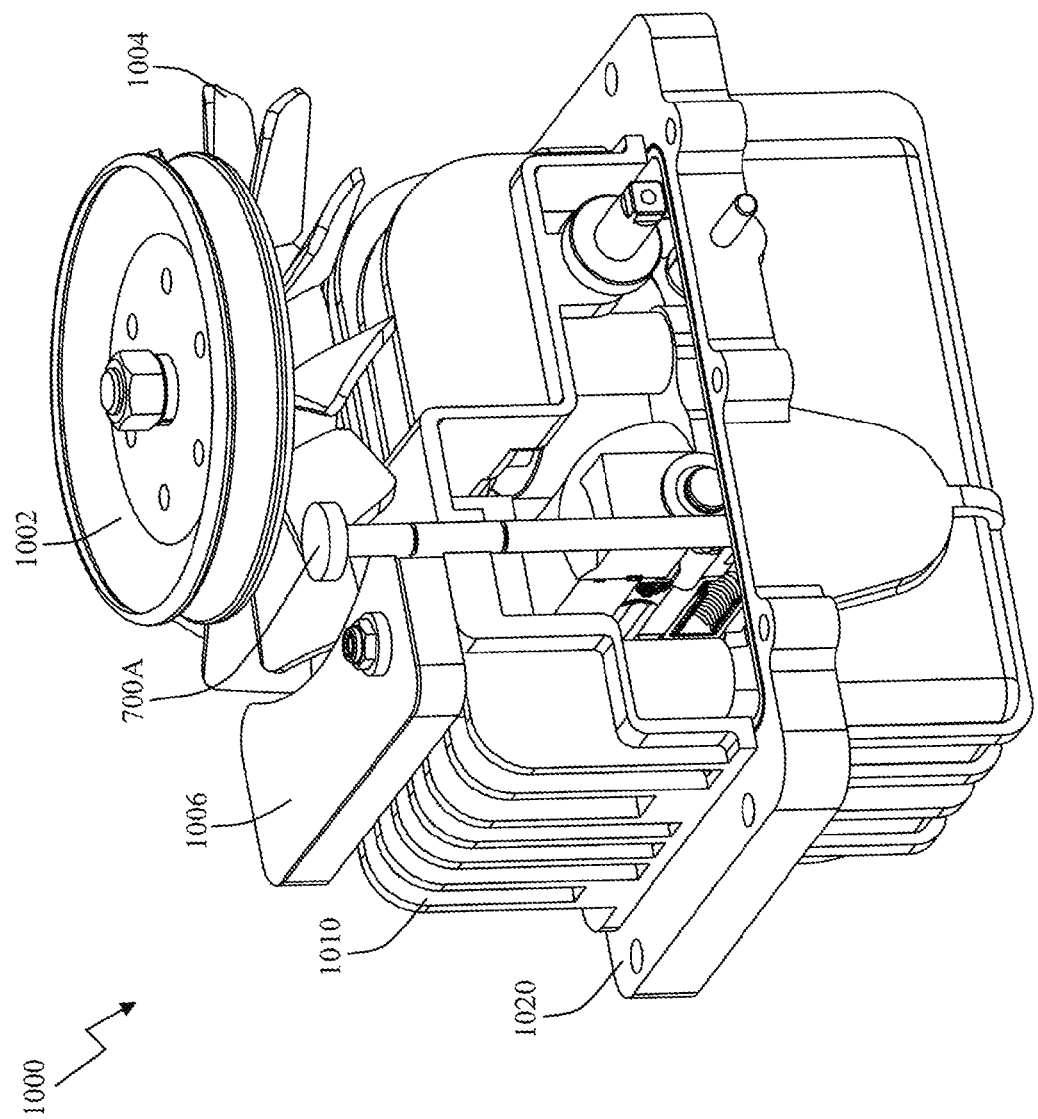
FIG. 10 displays a right side perspective view of a hydraulic motor with the pressure release pin of FIG. 7 installed thereon in accordance with one embodiment of the present invention.

FIG. 10 displays a hydraulic motor 1000 with a bypass pin 700A and actuator 800 (not shown for ease of illustration) installed in accordance with one embodiment of the present invention. The hydraulic motor 1000 has a drive pulley 1002 and cooling fins 1004. Located on the hydraulic motor 1000 is expansion chamber 1006, upper housing 1010 and lower housing 1020. As can be seen in FIG. 10, a portion of the upper housing 1010 has been removed to allow a view into the hydraulic motor 1000.

Figure 11:
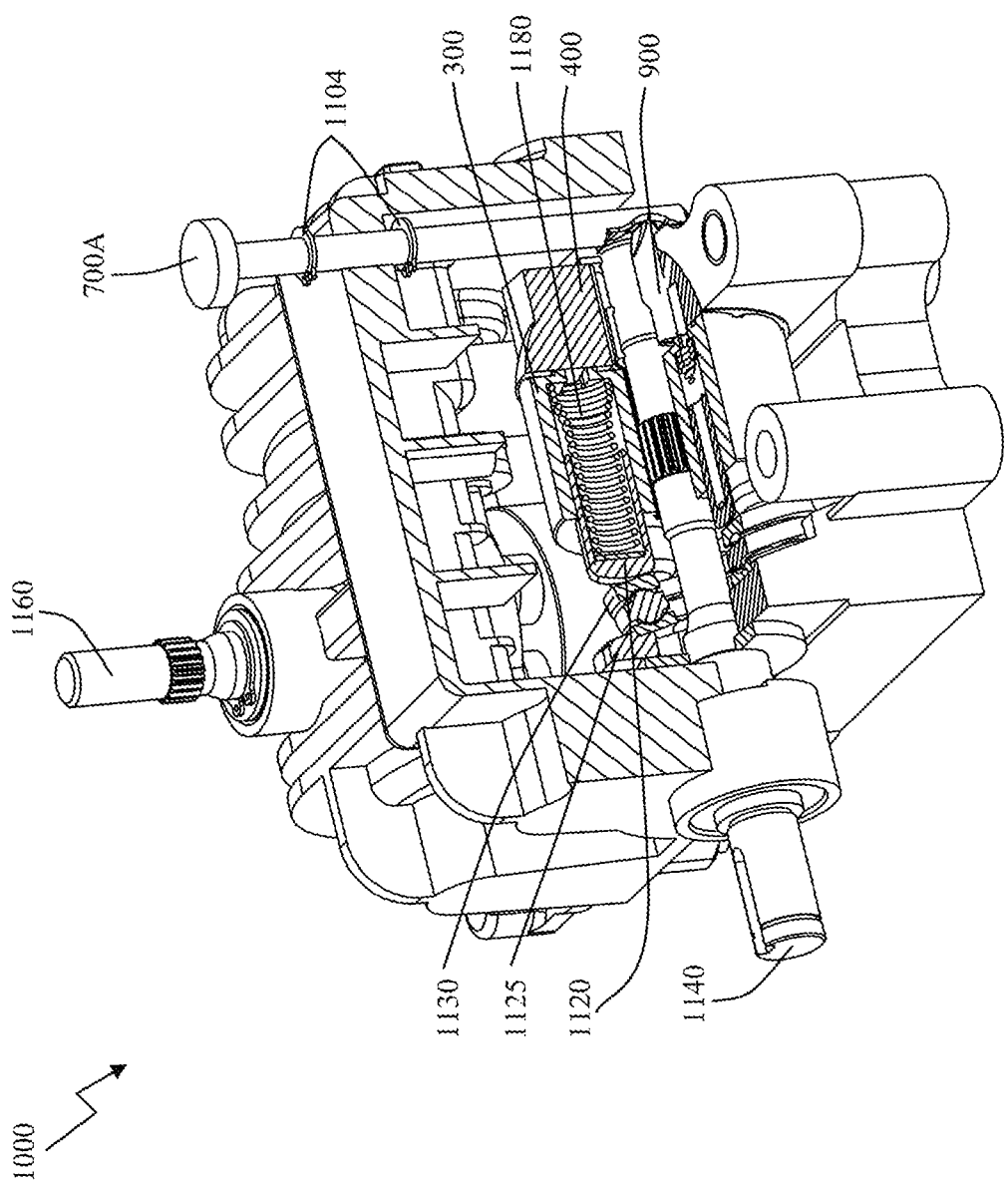
FIG. 11 displays a left side perspective cut away view of a hydraulic motor of FIG. 10 with the pressure release pin in a disengaged position.

FIG. 11 displays another view of the hydraulic motor 1000 with more of the upper housing 1010 removed to better view the bypass pin and actuator 900. For ease of illustration, actuator 900 is shown installed in hydraulic motor 1000, although actuator 800 may also have been installed. As shown in FIG. 11, the bypass pin 700A is in the disengaged position. When installed in the hydraulic motor 1000, the tip of the actuator 900 may be positioned near the barrel 300 similar to the tip 152 of bypass pin 150. The bypass pin 700A is shown parallel to the drive shaft 1160 and perpendicular to output drive shaft 1140, however, this orientation may be varied depending on the optimum location of the bypass pin 700A.

In the disengaged position, the tip 962 may not be in direct contact with the barrel 300 but in close proximity to the barrel. When engaged by pushing or pulling the bypass pin 700A, the angled end 920 of actuator 900 will move from the depression and travel up one of the angled surfaces. When the angled end 920 moves up the angled surface 740A, the tip 962 will be pushed up against the barrel 300. The farther the rounded end 920 travels up the angled surface 740A, the greater the force applied to the barrel 300 by the tip 962. Further, when the angled end 920 comes into contact with the detent 750 of bypass pin 700A, the bypass pin 700A may lock into place.

When the bypass pin 700A moves from either engaged position back to the disengaged position (its rest position), the angled end 920 will move down the angled surface 740A of the bypass pin 700A. As the angled end 920 moves down the angled surface 740A, 962 will move away from the barrel 300. Springs 1180 within the pistons 1150 of the barrel 300 will push the barrel 300 towards the output valve body 400.

Figure 12:
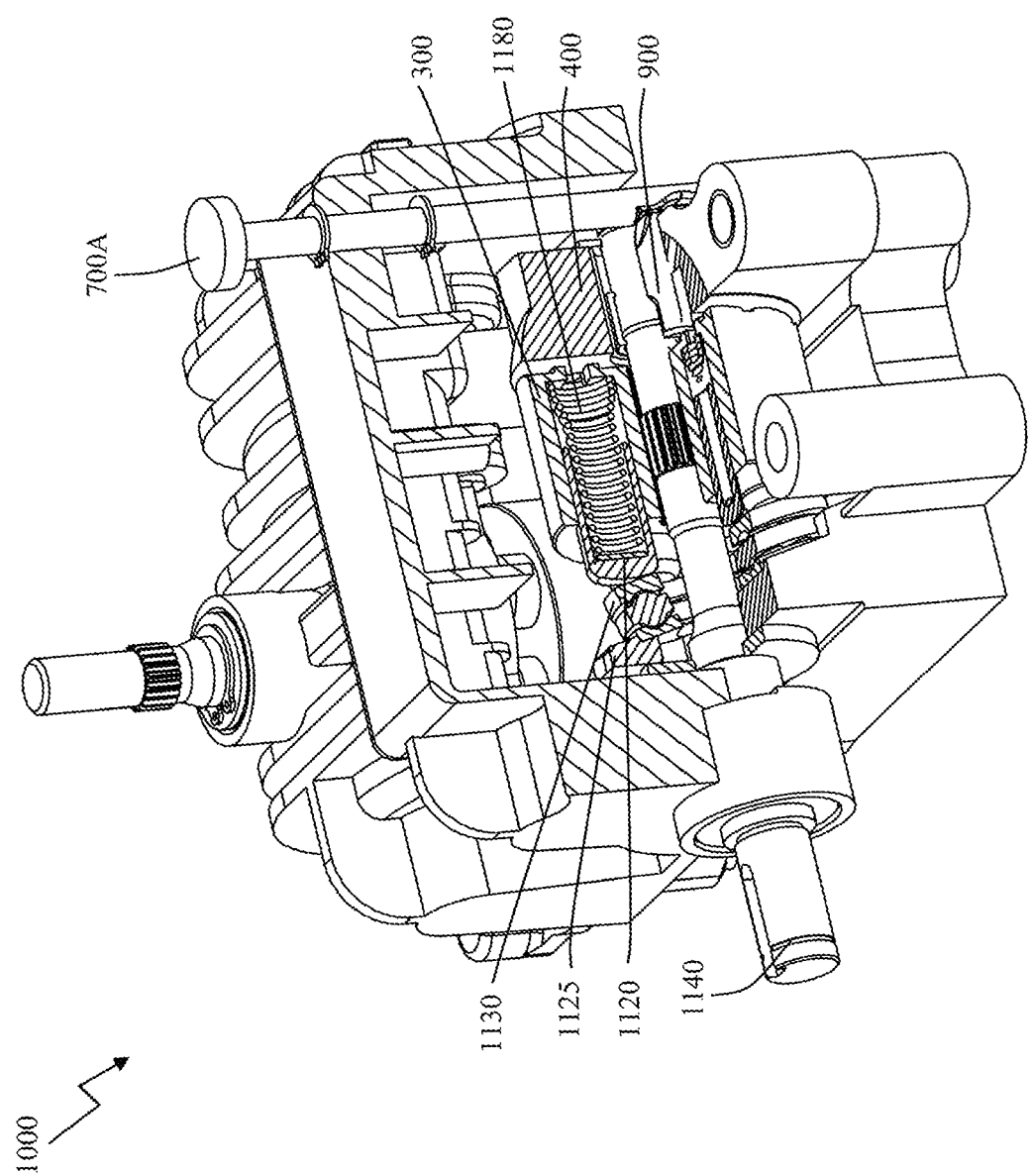
FIG. 12 displays a left side perspective cut away view of a hydraulic motor of FIG. 10 with the pressure release pin in an engaged position.

FIG. 12 shows the hydraulic motor 1000 with the bypass pin 700A in an engaged position. In this embodiment, the bypass pin 700A is pushed in to move it to the engaged position. As can be seen in FIG. 12, the angled end 920 has moved up the angled surface 740A of the bypass pin 700A and the tip 962 has pushed the barrel 300 away from the output valve body 400. When the barrel 300 is pushed away from the output valve body 400, hydraulic fluid normally trapped within the output valve body 400 no longer causes pressure to be exerted against the barrel 300 and the barrel 300 is free to rotate.

Figure 13:
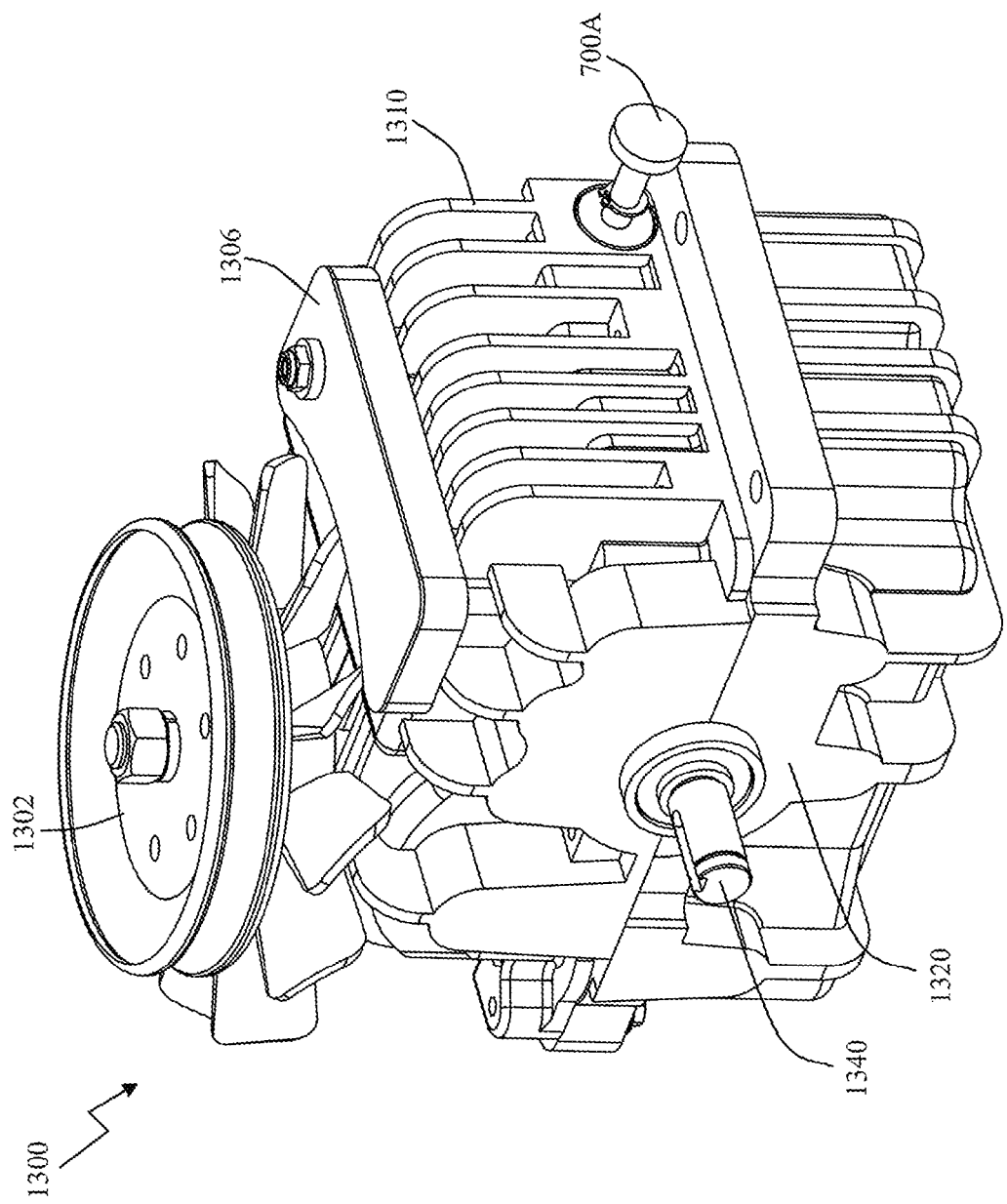
FIG. 13 displays a right side perspective view of a hydraulic motor with the pressure release pin of FIG. 7 installed thereon in accordance with a further embodiment of the present invention.

FIG. 13 displays a hydraulic motor 1300 in accordance with a further embodiment of the present invention. The hydraulic motor 1300 has a drive pulley 1302 and cooling fins 1304. Located on the hydraulic motor 1300 is an expansion chamber 1306, upper housing 1310 and lower housing 1320. As can be seen in FIG. 13 the bypass pin 700A positioned perpendicularly to both the output drive shaft and the main drive shaft 1340. It is to be understood that the inventive concepts as they relate to the bypass pins 700A, 700B or 700C provide that they may be positioned 360 degrees around the output drive shaft and provide similar functionality by releasing the pressure within the hydraulic motor 1300 when the bypass pin 700A, 700B, or 700C move to an engaged position.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A hydraulic transmission comprising:
    a hydraulic pump, the hydraulic pump receiving rotational energy from a power source, the power source causing the hydraulic pump to pump hydraulic fluid to,
    a hydraulic motor, and;
    a bypass pin, the bypass pin having a first end, connected to a shaft connected to a tip, the hydraulic motor receiving the hydraulic fluid from the hydraulic pump, the hydraulic motor and hydraulic pump encased in a casing, the first end of the bypass pin positioned outside the casing, the shaft of the bypass pin extending through the casing and into the hydraulic motor, the hydraulic motor further comprising
    a fluid directional member in contact with;
    a rotating member;
    wherein the hydraulic fluid flows from the hydraulic pump and is directed first through the fluid directional member, then through the rotating member, the hydraulic fluid within the hydraulic motor causing residual hydraulic pressure when the hydraulic pump is not pumping hydraulic fluid, the tip of bypass pin configured to push the rotating member away from the fluid directional member when the bypass pin moves between a first and second position, the bypass pin moveable when a linear force is applied to the first end of the bypass pin.

2. The hydraulic transmission of claim 1 further comprising a drive shaft, the drive shaft inserted into the barrel, wherein the external linear force is applied in a plane that is parallel to the drive shaft.

3. The hydraulic transmission of claim 1 further comprising a return spring, the return spring positioned around the shaft of the bypass pin between the casing and the head, the return spring causing the bypass pin to move from the second position to the first position when the external linear force is removed.

4. The hydraulic transmission of claim 1 wherein the rotating member is a barrel.

5. The hydraulic transmission of claim 1 wherein the fluid directional member is an output valve body.

6. A bypass pin for a hydrostatic transmission the hydrostatic transmission having a hydraulic motor, the bypass pin comprising
    a first end positioned at a first end of a shaft,
    a tip positioned at an opposite end of the shaft,
    wherein the bypass pin is configured to receive a linear force exerted against the first end in a first direction causing the bypass pin to move in the first direction, the shaft of the bypass pin configured to be positioned through a casing containing the hydrostatic transmission, the tip configured to contact a rotating member in the hydraulic motor when the rotating member is in contact with a fluid directional member, the tip pushing the rotating member away from a fluid directional member in the first direction when the linear force is applied.

7. The bypass pin of claim 6 wherein the hydrostatic transmission further comprising a drive shaft, the drive shaft inserted into the rotating member.

8. The bypass pin of claim 6 further comprising a return spring, the return spring configured to attach to the bypass pin around the shaft between the casing and the first end, the return spring causing the bypass pin to move in an opposite direction when the linear force is removed.

9. The bypass pin of claim 6 wherein the rotating member is a barrel.

10. The bypass pin of claim 6 wherein the fluid directional member is an output valve body.

11. The bypass pin of claim 6 wherein the linear force is parallel to the shaft.

12. The bypass pin of claim 6 wherein the linear force is perpendicular to the shaft.

13. A bypass pin for a hydrostatic transmission the hydrostatic transmission having a hydraulic motor, the bypass pin comprising
    a head positioned at a first end of a shaft,
    an angled surface positioned towards an opposite end of the shaft,
    wherein the bypass pin is configured to mate with an actuator, the actuator further comprising a tip and contoured end, the contoured end positioned near the angled end, the bypass pin receiving a linear force exerted against the head in a first direction causing the bypass pin to move in the first direction causing the contoured end to move up the angled surface, the shaft of the bypass pin positioned through a casing containing the hydrostatic transmission, the tip coming into contact with a rotating member in the hydraulic transmission when the contoured end moves up the angled surface, the rotating member being in contact with a fluid directional member, the tip pushing the rotating member away from the fluid directional member when the linear force is applied.

14. The bypass pin of claim 13 wherein the linear force is applied by pushing the bypass pin.

15. The bypass pin of claim 13 wherein the linear force is applied by pulling the bypass pin.

16. The bypass pin of claim 13 wherein the linear force is applied by either pushing or pulling the bypass pin.

17. The bypass pin of claim 13 further comprising a return spring, the return spring configured to attach to the bypass pin around the shaft between the casing and the first end, the return spring causing the bypass pin to move in an opposite direction when the linear force is removed.

18. The bypass pin of claim 13 wherein the rotating member is a barrel.

19. The bypass pin of claim 13 further comprising a detent positioned on the shaft wherein the detent is configured to accept the contoured end of the actuator.

20. The bypass pin of claim 13 wherein the linear force is parallel to the shaft.

21. The bypass pin of claim 13 wherein the linear force is perpendicular to the shaft.

\* \* \* \* \*